US012272894B2

(12) United States Patent
Matsuda et al.

(10) Patent No.: US 12,272,894 B2
(45) Date of Patent: Apr. 8, 2025

(54) CONNECTOR FOR IMPROVING TRANSMISSION PERFORMANCE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Hidekazu Matsuda, Mie (JP); Kazuki Hiramatsu, Mie (JP); Taiga Kadoyama, Mie (JP); Maika Ido, Mie (JP); Masanao Yamashita, Osaka (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 352 days.

(21) Appl. No.: 17/868,207

(22) Filed: Jul. 19, 2022

(65) Prior Publication Data

US 2023/0033981 A1 Feb. 2, 2023

(30) Foreign Application Priority Data

Jul. 27, 2021 (JP) ................................ 2021-122068

(51) Int. Cl.
*H01R 13/6476* (2011.01)
*H01R 13/40* (2006.01)
(Continued)

(52) U.S. Cl.
CPC ........... *H01R 13/40* (2013.01); *H01R 13/502* (2013.01); *H01R 13/516* (2013.01); *H01R 13/6473* (2013.01)

(58) Field of Classification Search
CPC .. H01R 13/40; H01R 13/502; H01R 13/6473; H01R 4/183; H01R 4/184
See application file for complete search history.

(56) References Cited

U.S. PATENT DOCUMENTS

| | | | | |
|---|---|---|---|---|
| 6,164,995 A * | 12/2000 | Peloza | H01R 13/6585 | 439/188 |
| 2005/0287875 A1* | 12/2005 | Kojima | H01R 4/185 | 439/750 |

(Continued)

FOREIGN PATENT DOCUMENTS

| | | |
|---|---|---|
| JP | 2005-347191 A | 12/2005 |
| JP | 2020-107569 A | 7/2020 |

(Continued)

*Primary Examiner* — Neil Abrams
(74) *Attorney, Agent, or Firm* — Venjuris, P.C.

(57) ABSTRACT

A connector 10 is provided with an inner conductor 13 to be connected to a wire 18, a dielectric 14 for accommodating the inner conductor 13, and an electrically conductive impedance adjusting member 12 to be mounted on the wire. The inner conductor 13 includes a base portion 33 and an insulation barrel piece 35 rising from the base portion 33 and to be crimped to a coating 23 of the wire 18. The insulation barrel piece 35 includes an inclined portion 39 inclined toward the impedance adjusting member 12 with distance from the base portion 33 on an end edge on a side facing the impedance adjusting member 12.

5 Claims, 6 Drawing Sheets

(51) Int. Cl.

| | |
|---|---|
| ***H01R 13/502*** | (2006.01) |
| ***H01R 13/516*** | (2006.01) |
| ***H01R 13/6473*** | (2011.01) |

(56) References Cited

U.S. PATENT DOCUMENTS

| | | | | |
|---|---|---|---|---|
| 2013/0171872 | A1* | 7/2013 | Kanda | H01R 13/28<br>439/607.41 |
| 2013/0171873 | A1* | 7/2013 | Kanda | H01R 24/44<br>439/607.51 |
| 2017/0060192 | A1 | 3/2017 | Cousins et al. | |
| 2018/0168027 | A1 | 6/2018 | Cousins et al. | |
| 2019/0214761 | A1* | 7/2019 | Ho | H05K 7/1069 |
| 2019/0312388 | A1* | 10/2019 | Maesoba | H01R 13/6474 |
| 2019/0319406 | A1* | 10/2019 | Maesoba | H01R 24/22 |
| 2020/0227863 | A1* | 7/2020 | Maesoba | H01R 4/185 |
| 2021/0066858 | A1* | 3/2021 | Bergner | H01R 43/24 |
| 2023/0035860 | A1* | 2/2023 | Hibino | H01R 13/6585 |
| 2023/0291130 | A1* | 9/2023 | Zebhauser | H01R 43/16 |

FOREIGN PATENT DOCUMENTS

| | | | |
|---|---|---|---|
| JP | 2020-107570 | A | 7/2020 |
| JP | 2021-028872 | A | 2/2021 |

* cited by examiner

CONNECTOR FOR IMPROVING TRANSMISSION PERFORMANCE

CROSS-REFERENCE TO RELATED APPLICATIONS

This application is based on and claims priority from Japanese Patent Application No. 2021-122068, filed on Jul. 27, 2021, with the Japan Patent Office, the disclosure of which is incorporated herein in its entirety by reference.

TECHNICAL FIELD

The present disclosure relates to a connector.

BACKGROUND

A connector disclosed in Japanese Patent Laid-open Publication No. 2021-028872 is provided with inner conductors, a dielectric for accommodating the inner conductors and an outer conductor for accommodating the dielectric. The inner conductor includes a wire connecting portion to be connected to a coated wire. A pair of the coated wires are provided in a shielded cable. The two coated wires are coupled by an adjusting member for adjusting impedance in end parts exposed from a shield body. Such a shield connector is also disclosed in Japanese Patent Laid-open Publication Nos. 2021-015701, 2020-107570, 2020-107569 and 2005-347191.

SUMMARY

The coated wires are exposed and impedance is not adjusted between the wire connecting portions and the adjusting member. Thus, there is a room for improving transmission performance.

Accordingly, the present disclosure aims to provide a connector capable of improving transmission performance.

The present disclosure is directed to a connector with an inner conductor to be connected to a wire, a dielectric for accommodating the inner conductor, and an electrically conductive impedance adjusting member to be mounted on the wire, wherein the inner conductor includes a base portion and an insulation barrel piece rising from the base portion and to be crimped to a coating of the wire, and the insulation barrel piece includes an inclined portion inclined toward the impedance adjusting member with distance from the base portion on an end edge on a side facing the impedance adjusting member.

According to the present disclosure, it is possible to provide a connector capable of improving transmission characteristics.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented here.

[Description of Embodiments of Present Disclosure]

First, embodiments of the present disclosure are listed and described.

(1) The connector of the present disclosure is provided with an inner conductor to be connected to a wire, a dielectric for accommodating the inner conductor, and an electrically conductive impedance adjusting member to be mounted on the wire, wherein the inner conductor includes a base portion and an insulation barrel piece rising from the base portion and to be crimped to a coating of the wire, and the insulation barrel piece includes an inclined portion inclined toward the impedance adjusting member with distance from the base portion on an end edge on a side facing the impedance adjusting member.

According to this configuration, the insulation barrel piece can be closer to (approach) the impedance adjusting member by as much as the inclined portion is inclined, and an impedance adjustment range can be expanded. Thus, transmission performance can be improved.

(2) Preferably, the inclined portion is inclined rearward from the base portion toward top, and the wire includes a part inclined downward toward rear between the insulation barrel piece and the impedance adjusting member.

According to this configuration, since the inclined portion and the impedance adjusting member can face each other in parallel or nearly in parallel, an impedance variation can be reduced and transmission performance can be further improved.

[Details of Embodiment of Present Disclosure]

[Embodiment]

A specific example of an embodiment of the present disclosure is described below with reference to the drawings. Note that the present invention is not limited to this illustration and is intended to be represented by claims and include all changes in the scope of claims and in the meaning and scope of equivalents.

Figure 1:
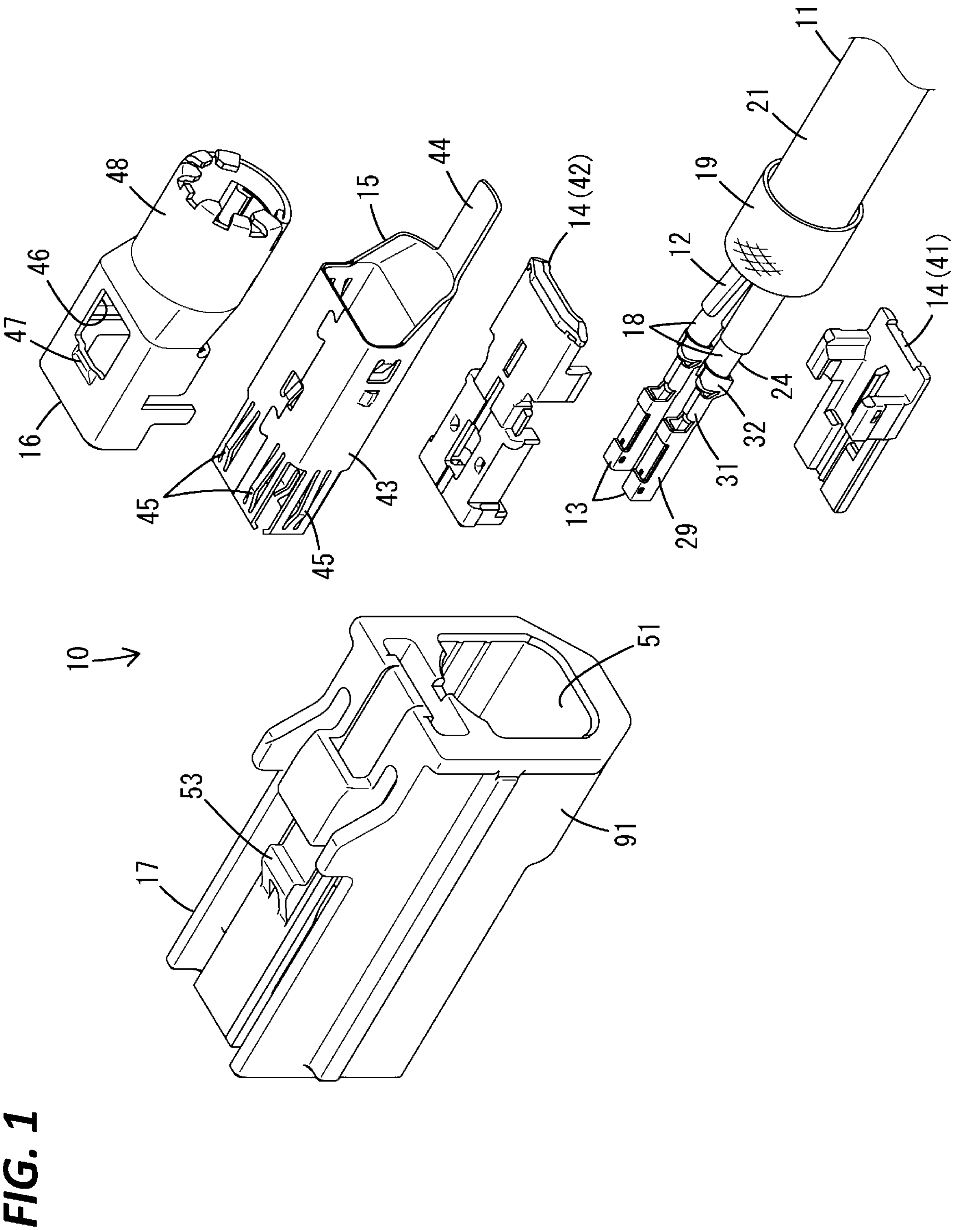
FIG. 1 is an exploded perspective view of a connector of an embodiment.

A connector 10 of this embodiment is illustrated as a shield connector connected to an end of a cable 11, in which a communication signal is transmitted. As shown in FIG. 1, the connector 10 is provided with an impedance adjusting member 12, inner conductors 13, a dielectric 14, an outer conductor 15, an outer conductor cover 16 and a housing 17. The connector 10 is connected to a mating connector 80. The mating connector 80 is illustrated also as a shield connector connected to an end of a cable 11. Note that, in the following description, a side of the connector 10 to be connected to the mating connector 80 is referred to as a front side concerning a front-rear direction. A vertical direction is based on a vertical direction of each figure.

As shown in FIG. 1, the cable 11 includes two wires 18, a shield body 19 such as a braided wire for collectively covering the outer peripheries of the wires 18 and an insulating sheath 21 for covering the outer periphery of the shield body 19. The wire 18 is a coated wire and includes a conductive core wire 22 and an insulating coating 23 covering the outer periphery of the core wire 22.

The sheath 21 is removed and the two wires 18 are exposed in a front end part of the cable 11. An end part of the shield body 19 is folded from an end part of the sheath 21 and exposed on an outer peripheral side of the sheath 21.

Figure 3:
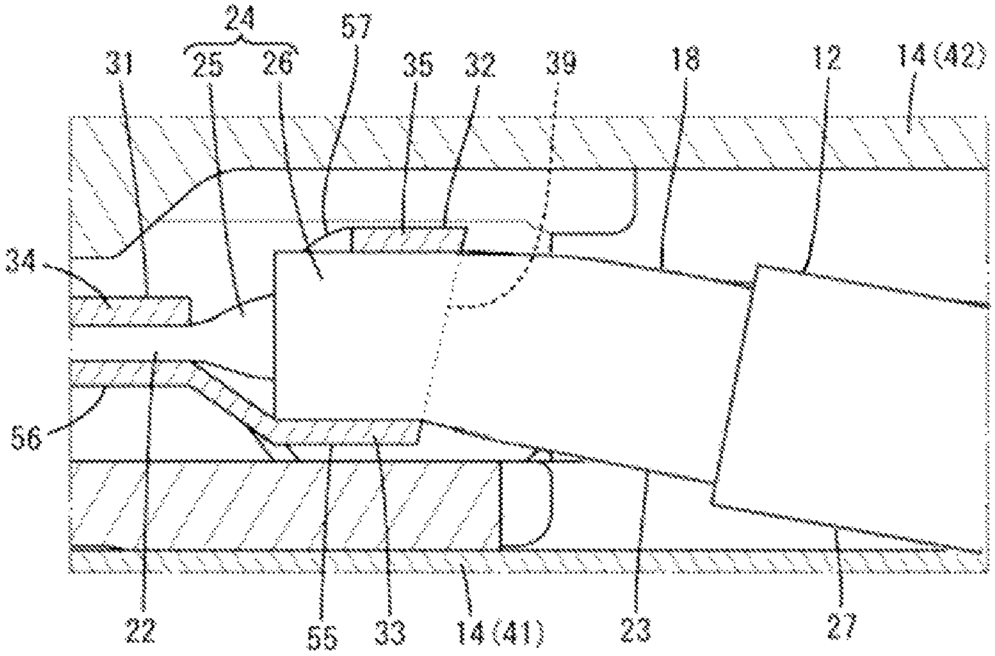
FIG. 3 is a partial enlarged section of a range from an insulation barrel to an impedance adjusting member in FIG. 2.
Figure 5:
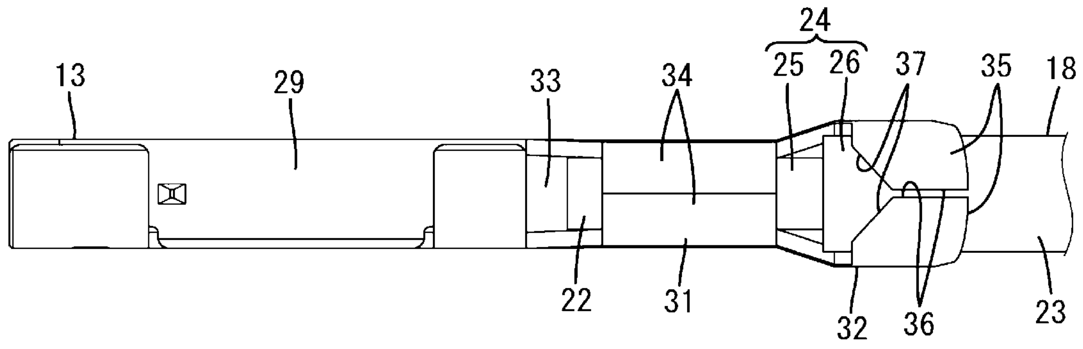
FIG. 5 is a plan view of an inner conductor connected to an end of a wire.
Figure 6:
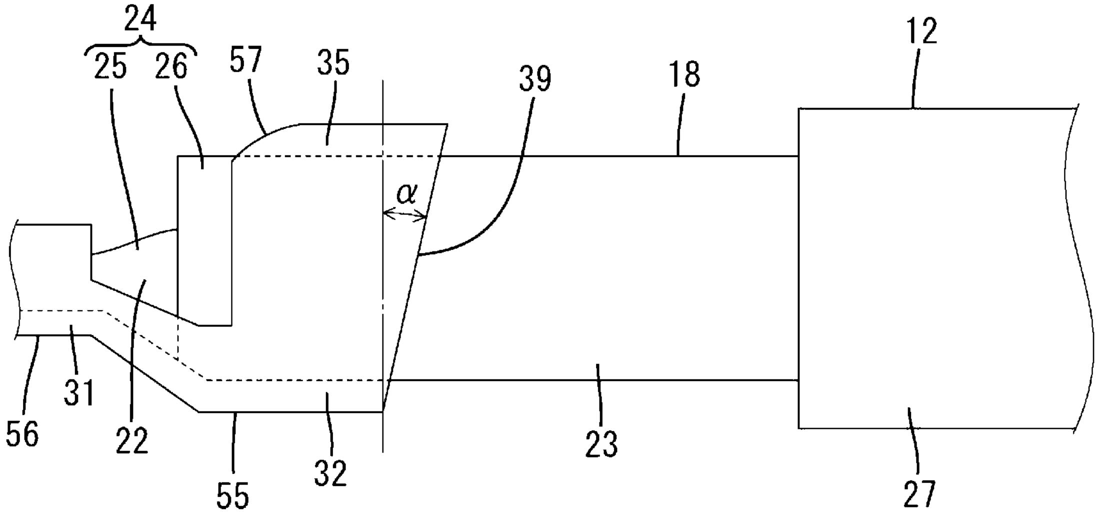
FIG. 6 is a partial enlarged side view of the insulation barrel connected to the wire.

The wire 18 includes an exposed portion 24 exposed to outside on a side forward of the end part of the sheath 21 (folded part of the shield body 19). As shown in FIGS. 3, 5 and 6, the exposed portion 24 includes a core wire exposed portion 25 constituted by the core wire 22 exposed by removing the coating 23 in a front end part and a coating exposed portion 26 in which the coating 23 is exposed from the core wire exposed portion 25 to the impedance adjusting member 12.

<Impedance Adjusting Member>

Figure 4:
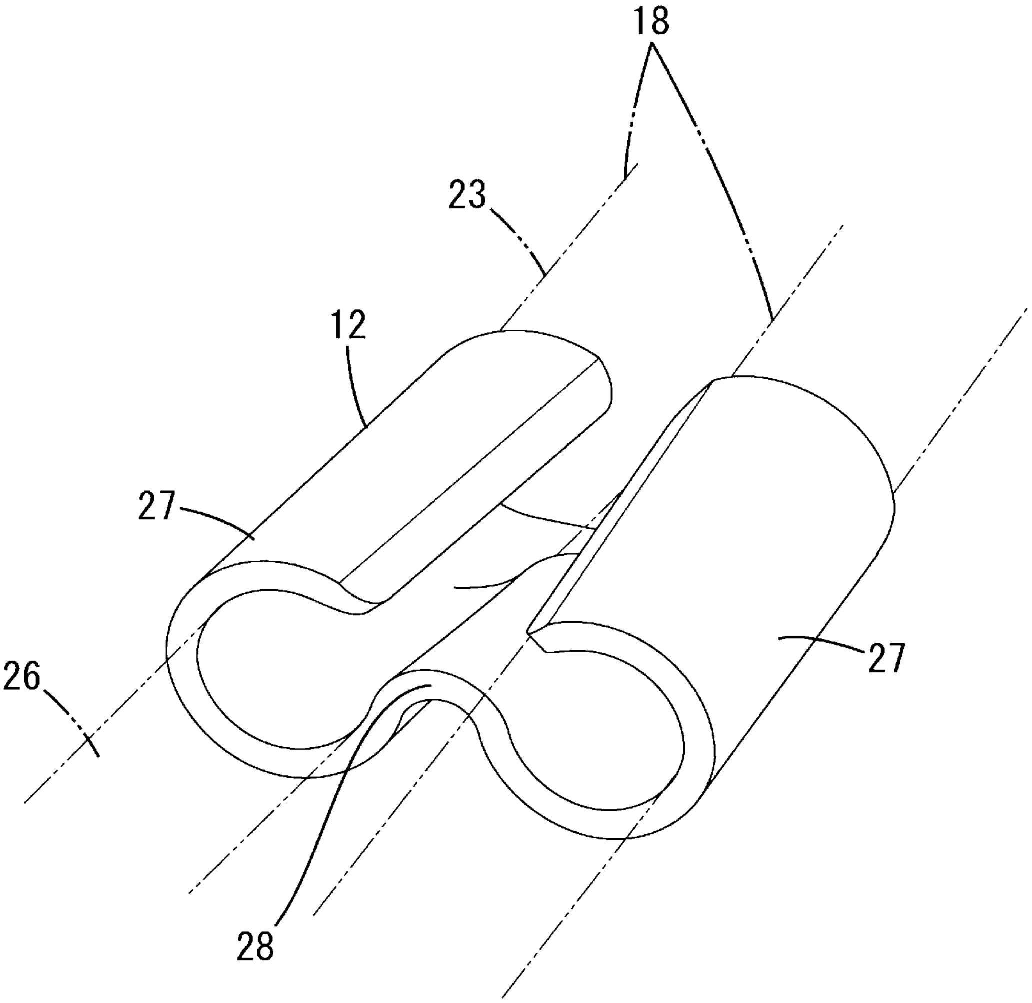
FIG. 4 is a perspective view of the impedance adjusting member.

The impedance adjusting member 12 is formed, such as by bending an electrically conductive metal plate. As shown in FIG. 4, the impedance adjusting member 12 includes two adjusting body portions 27 to be mounted on the coatings 23 of the coating exposed portions 26 of the respective wires 18 and a coupling portion 28 coupling the respective adjusting body portions 27.

Each adjusting body portion 27 is in the form of a hollow cylinder having a C-shaped cross-section and configured to cover the outer peripheral surface of the coating 23 of the coating exposed portion 26 near the sheath 21 in a circumferential direction. A length in the front-rear direction of the adjusting body portion 27 is shorter than that of the coating exposed portion 26.

The coupling portion 28 has a curved shape to bulge upward and couples the respective adjusting body portions 27 in a lateral direction. The coupling portion 28 is formed wider in the lateral direction in a front part than in a rear part. Thus, the impedance adjusting member 12 is wider in the lateral direction in the front part than in the rear part.

<Inner Conductors>

Figure 2:
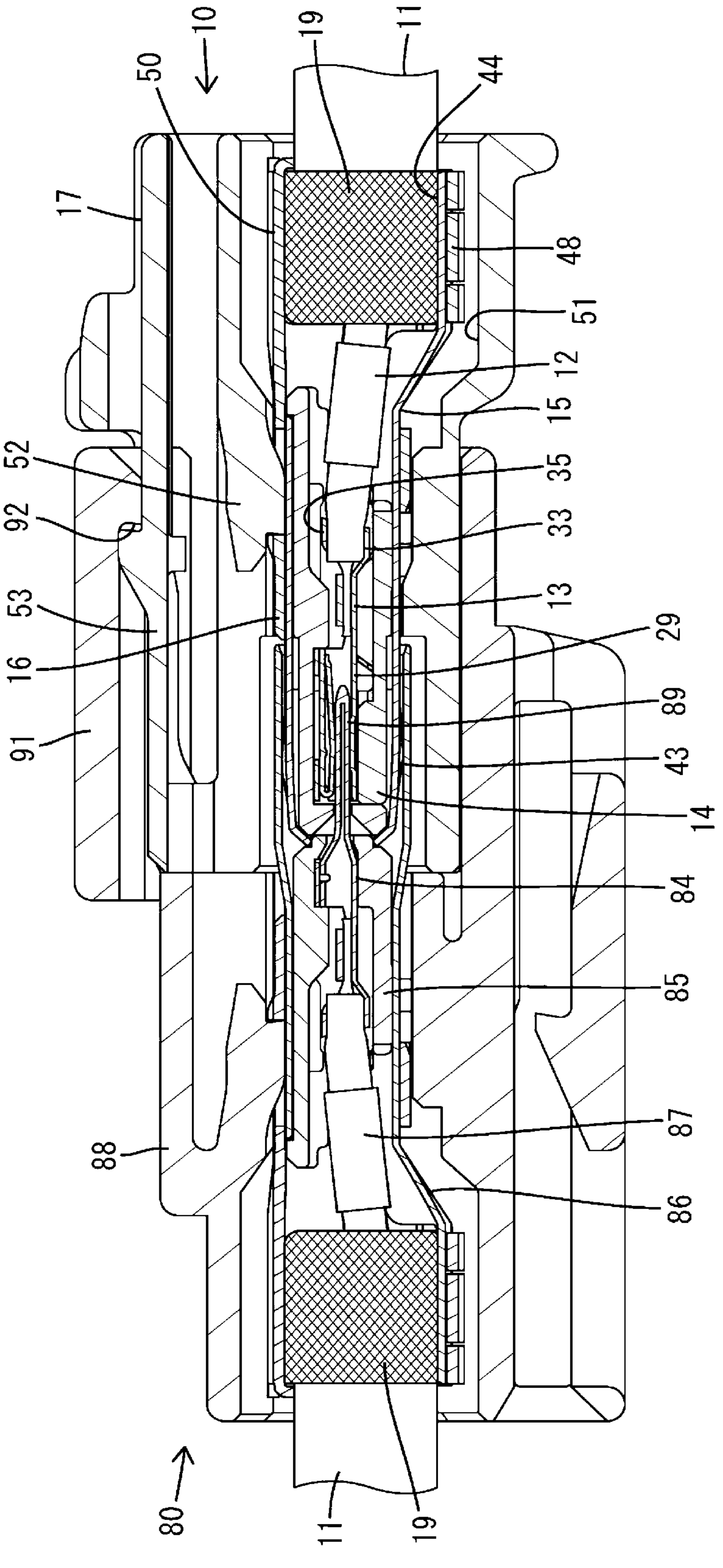
FIG. 2 is a side view in section showing a state where the connector is connected to a mating connector.

The inner conductor 13 is formed, such as by bending an electrically conductive metal plate. As shown in FIGS. 1 and 5, the inner conductor 13 is a female terminal and includes a wire barrel 31 in the form of an open barrel connected behind a terminal connecting portion 29 and an insulation barrel 32 in the form of an open barrel connected behind the wire barrel 31. As shown in FIG. 2, the terminal connecting portion 29 is electrically connected to a mating inner conductor 84 of the mating connector 80 when the connector 10 and the mating connector 80 are connected.

Further, the inner conductor 13 includes a base portion 33 in the form of a strip plate extending over an entire length in the front-rear direction. The wire barrel 31 includes a pair of wire barrel pieces 34 rising from both left and right sides of an intermediate part in the front-rear direction of the base portion 33. As shown in FIG. 5, the respective wire barrel pieces 34 are wound on the core wire exposed portion 25 of the wire 18. In this way, the wire barrel 31 is crimped and electrically connected to the core wire exposed portion 25. Similarly, the insulation barrel 32 includes a pair of insulation barrel pieces 35 rising from both left and right sides of a rear end part of the base portion 33. The respective insulation barrel pieces 35 are wound on the coating exposed portion 26 of the wire 18. The insulation barrel 32 is crimped and mechanically connected to the coating exposed portion 26.

A bottom surface 55 of the insulation barrel 32 is a bottom surface of a rear end part of the base portion 33 and, as shown in FIG. 6, located at a position lower than a bottom surface 56 of the wire barrel 31 in a crimped state and arranged along the front-rear direction.

As shown in FIG. 5, the respective insulation barrel pieces 35 include straight edges 36 and tapered edges 37 on facing edges facing each other in the crimped state. The straight edges 36 of the respective insulation barrel pieces 35 are arranged to face each other in parallel along the front-rear direction in the crimped state. The tapered edges 37 of the insulation barrel pieces 35 are obliquely arranged wider apart in the lateral direction from the straight edges 36 toward the front. Further, a part including the tapered edge 37 in a front part of the insulation barrel piece 35 serves as a thickness reduced portion 57 reducing a plate thickness toward the front when the insulation barrel piece 35 in the crimped state is viewed laterally as shown in FIG. 6.

Further, as shown in FIG. 6, each insulation barrel piece 35 includes an inclined portion 39 inclined rearward toward the top in the crimped state on a rear edge. Specifically, the inclined portion 39 is inclined rearward at an angle of inclination $\alpha$ of 20° to 40°, preferably 30°, with respect to the vertical direction from the rear end of the bottom surface 55 to the rear end of the upper surface of the insulation barrel piece 35. The inclined portion 39 is formed by being deformed by an unillustrated crimping die when the inner conductor 13 is crimped to the wire 18, or formed in a metal stamping process when the inner conductor 13 is formed. The insulation barrel piece 35 is shaped wider in the front-rear direction toward the top by the inclined portion 39 except in the part including the tapered edge 37 (upper end part). Note that two inner conductors 13 are provided to correspond to the two wires 18 in the connector 10.

<Dielectric>

The dielectric 14 is formed of an insulating synthetic resin material into a rectangular parallelepiped shape long in the front-rear direction. As shown in FIG. 1, the dielectric 14 is formed by assembling a lower member 41 and an upper member 42 with each other in the vertical direction. The two inner conductors 13 are accommodated side by side in the lateral direction in the dielectric 14 while being connected to the wires 18.

<Outer Conductor>

The outer conductor 15 is formed, such as by bending an electrically conductive metal plate. As shown in FIG. 1, the outer conductor 15 includes a fitting tube portion 43 in the form of a rectangular tube long in the front-rear direction and a shield connecting portion 44 to be connected to the shield body 19 of the cable 11.

The dielectric 14 is inserted and accommodated into the fitting tube portion 43 from behind. If the dielectric 14 is accommodated into the fitting tube portion 43, the inner conductors 13 are electrically insulated from the fitting tube portion 43 by the dielectric 14. The fitting tube portion 43 is formed with resiliently deformable resilient contact portions 45 to be brought into contact with a later-described mating outer conductor 86 of the mating connector 80.

The shield connecting portion 44 is in the form of a plate extending rearward from the lower edge of the rear end of the fitting tube portion 43. As shown in FIG. 2, the shield connecting portion 44 is arranged below the shield body 19 and connected to the shield body 19 by receiving a crimping force of the outer conductor cover 16.

<Outer Conductor Cover>

The outer conductor cover 16 is formed, such as by bending an electrically conductive metal plate. As shown in FIG. 2, a rear part of the fitting tube portion 43 is arranged inside a front part of the outer conductor cover 16. As shown in FIG. 1, the upper wall of the front part of the outer conductor cover 16 is formed with a rectangular opening hole 46 and a housing locking projection 47 projecting upward from the front edge of the opening hole 46.

A rear part of the outer conductor cover 16 is formed with a shield barrel portion 48. As shown in FIG. 2, the shield barrel portion 48 is crimped and connected to the shield body 19 of the cable 11 while the shield connecting portion 44 of the outer conductor 15 is arranged inside. Note that the shield barrel portion 48 shown in FIG. 1 is in a deformed form by being crimped to the shield body 19 of the cable 11 for the sake of convenience. To be precise, the shield barrel portion 48 is in the form of an open barrel before deformation.

<Housing>

The housing 17 is made of synthetic resin and includes, as shown in FIG. 2, a module accommodating portion 51 penetrating in the front-rear direction. A locking lance 52 is formed to project forward on the upper surface of the inner wall of a rear part of the module accommodating portion 51. The locking lance 52 is resiliently deformable in the vertical direction.

A module 50 formed by assembling the inner conductors 13, the dielectric 14, the outer conductor 15 and the outer conductor cover 16 is accommodated into the module accommodating portion 51. As shown in FIG. 2, the locking lance 52 is locked to the locking projection 47 while being fit into the opening hole 46, whereby the module 50 is retained in the module accommodating portion 51. Further, the upper wall of the housing 17 is formed with a lock arm 53.

<Mating Connector>

The mating connector 80 is provided with the mating inner conductors 84 as male terminals, a mating dielectric 85 for accommodating the mating inner conductors 84, a mating outer conductor 86 for surrounding the mating dielectric 85 and a mating housing 88 connectable to the housing 17 as shown in FIG. 2. The mating inner conductors 84 are respectively connected to two wires 18 of the cable 11 and insulated from the mating outer conductor 86 by the mating dielectric 85. A mating impedance adjusting member 87 is mounted on the respective wires 18. The mating impedance adjusting member 87 has the same shape as the impedance adjusting member 12.

The mating inner conductor 84 includes a tab 89 projecting forward. The tab 89 of the mating inner conductor 84 is inserted into the terminal connecting portion 29 of the inner conductor 13 and electrically connected when the connector 10 and the mating connector 80 are connected. Note that an insulation barrel of the mating inner conductor 84 is also formed with inclined portions.

The mating outer conductor 86 is connected to a shield body 19 of the cable 11. The mating outer conductor 86 is put on the outer periphery of the fitting tube portion 43 of the outer conductor 15 and the resilient contact portions 45 contact the inner surface of the mating outer conductor 86 when the connector 10 and the mating connector 80 are connected.

The mating housing 88 includes a receptacle 91 in the form of a rectangular tube. A lock projection 92 is formed on the inner surface of the upper wall of the receptacle 91. The housing 17 is fit into the receptacle 91 of the mating housing 88. The housing 17 is held in a connected state in the receptacle 91 by locking the lock arm 53 to the lock projection 92.

<Functions>

As shown in FIG. 2, the inner conductor 13 is so arranged in the module 50 that an axial center is oriented in the front-rear direction in the dielectric 14. As shown in FIG. 3, the coating exposed portion 26 of the wire 18 is arranged and inclined toward a lower side, toward which the inclined portions 39 are inclined, from the rear end of the inner conductor 13 (inclined portions 39 of the insulation barrel pieces 35) to an end part of the sheath 21 (folded part of the shield body 19). The impedance adjusting member 12 is also arranged and inclined with respect to the front-rear direction in accordance with the inclination of the coating exposed portion 26. Here, the inclined portion 39 of the insulation barrel piece 35 is inclined more toward the impedance adjusting member 12 as compared to a conventional rear edge arranged along the vertical direction. Thus, according to this embodiment, an impedance adjustment range is expanded by as much as the inclined portion 39 is inclined. As a result, impedance can be effectively lowered and transmission characteristics (communication characteristics) can be improved. Moreover, impedance can be easily adjusted by adjusting the angle of inclination $\alpha$ of the inclined portion 39.

Further, in the case of this embodiment, the coating exposed portion 26 of the wire 18 is also inclined toward the lower side, toward which the inclined portions 39 are inclined, and the impedance adjusting member 12 is also inclined in accordance with the inclination of the coating exposed portion 26. Thus, the inclined portions 39 of the insulation barrel pieces 35 and the front end of the impedance adjusting member 12 can face each other in parallel or nearly in parallel, an impedance variation can be reduced and high speed transmission is possible. These hold true also for a relationship of the inclined portions of the insulation barrel pieces of the mating inner conductor 84 and the mating impedance adjusting member 87.

[Other Embodiments of Present Disclosure]

The embodiment disclosed this time should be considered illustrative in all aspects, rather than restrictive.

As another embodiment, the inclined portion of the insulation barrel piece may be, for example, formed with a step at an intermediate position without being inclined at a constant angle of inclination or may be inclined while being formed into a curved shape.

As another embodiment, the impedance adjusting member may not include the coupling portion for coupling the respective wires or may be a crimp ring for crimping wires of a UTP cable.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A connector, comprising:

an inner conductor to be connected to a wire;

a dielectric for accommodating the inner conductor; and an electrically conductive impedance adjusting member to be mounted on the wire, wherein:

the inner conductor includes a base portion and an insulation barrel piece rising from the base portion and to be crimped to a coating of the wire, and the insulation barrel piece includes an inclined portion inclined toward the impedance adjusting member with distance from the base portion on an end edge on a side facing the impedance adjusting member.

2. The connector of claim 1, wherein the inclined portion is inclined rearward from the base portion toward top.

3. The connector of claim 2, wherein the inclined portion and a front end of the impedance adjusting member face each other in parallel or nearly in parallel.

4. The connector of claim 2, wherein the inclined portion is formed by a step of being deformed by a crimping die when the inner conductor is connected to the wire.

5. The connector of claim 2, wherein the inclined portion is formed by a metal stamping process when the inner conductor is formed.

* * * * *